United States Patent
Liu et al.

(10) Patent No.: US 10,678,584 B2
(45) Date of Patent: Jun. 9, 2020

(54) FPGA-BASED METHOD FOR NETWORK FUNCTION ACCELERATING AND SYSTEM THEREOF

(71) Applicant: Huazhong University of Science and Technology, Wuhan, Hubei (CN)

(72) Inventors: Fangming Liu, Hubei (CN); Hai Jin, Hubei (CN); Xiaoyao Li, Hubei (CN)

(73) Assignee: HUAZHONG UNIVERSITY OF SCIENCE AND TECHNOLOGY, Wuhan (CN)

(*) Notice: Subject to any disclaimer, the term of this patent is extended or adjusted under 35 U.S.C. 154(b) by 128 days.

(21) Appl. No.: 16/135,598

(22) Filed: Sep. 19, 2018

(65) Prior Publication Data
US 2019/0213029 A1 Jul. 11, 2019

(30) Foreign Application Priority Data
Jan. 8, 2018 (CN) .......................... 2018 1 0017804

(51) Int. Cl.
G06F 9/455 (2018.01)
G06F 15/78 (2006.01)
G06F 9/50 (2006.01)

(52) U.S. Cl.
CPC ........ *G06F 9/45558* (2013.01); *G06F 9/5027* (2013.01); *G06F 15/7867* (2013.01); *G06F 2009/45595* (2013.01)

(58) Field of Classification Search
CPC .............. G06F 9/5027; G06F 9/45558; G06F 15/7871; G06F 15/7867; G06F 2209/509; G06F 2009/45595
See application file for complete search history.

(56) References Cited

U.S. PATENT DOCUMENTS 6,754,881 B2 6/2004 Kuhlmann et al.
9,100,012 B1 8/2015 Chen et al.
(Continued)

FOREIGN PATENT DOCUMENTS

CN 103399758 11/2013
CN 103403707 11/2013
(Continued)

OTHER PUBLICATIONS

Zazo, J.F., "A PCIe DMA engine to support the virtualiztion of 40 Gbps FPGA-accelerated network appliances", Conference on ReConFigurable Computing and FPGAs, Dec. 9, 2015.
(Continued)

*Primary Examiner* — Charles E Anya
(74) *Attorney, Agent, or Firm* — Michael X. Ye; Morris, Manning & Martin, LLP (57) ABSTRACT

The present invention relates to an FPGA-based method and system for network function accelerating. The method comprises: building a network function accelerating system that includes a physical machine and an accelerator card connected through a PCIe channel, wherein the physical machine includes a processor and the accelerator card includes an FPGA, in which the accelerator card serves to provide network function accelerating for the processor; the processor being configured to: when it requires the accelerator card to provide network function accelerating, check whether there is any required accelerator module present in the FPGA, and if yes, acquire an accelerating function ID corresponding to the required accelerator module, and if not, select at least one partial reconfigurable region in the FPGA and configure it into the required accelerator module and generate a corresponding accelerating function ID; and/or sending an accelerating request to the FPGA.

18 Claims, 2 Drawing Sheets

(56) References Cited

U.S. PATENT DOCUMENTS

| | | | |
|---|---|---|---|
| 2017/0126487 A1* | 5/2017 | Xie | H04L 45/54 |
| 2017/0139629 A1* | 5/2017 | Van Lunteren | G06F 12/0292 |
| 2017/0270417 A1* | 9/2017 | Watanabe | G06F 15/7867 |
| 2017/0351617 A1* | 12/2017 | Miyoshi | G06F 9/54 |

FOREIGN PATENT DOCUMENTS

| | | |
|---|---|---|
| CN | 103765395 | 4/2014 |
| CN | 105306241 | 2/2016 |

OTHER PUBLICATIONS

Jin, H., "Towards Dataflow-based Graph2 Accelerator", International Conference on Distributed Computing Systems, Jun. 8, 2017.

* cited by examiner

FPGA-BASED METHOD FOR NETWORK FUNCTION ACCELERATING AND SYSTEM THEREOF

FIELD

The present invention relates to data processing, and more particularly to an FPGA-based method and system for network function accelerating.

BACKGROUND

As software defines the development of network, for making data processing at the network level more scalable, network function processing applications based on software in traditional X86 servers have become increasingly popular. Compared to the traditional hardware-based network middleware (MiddleBox), these software-based network functions are more scalable, cost saving and easy to deploy.

The modern datacenters usually have a bandwidth of 10 Gbps-40 Gbps, and some datacenters even operate with a bandwidth up to 100 Gbps. In data link of 10 Gbps, for maximizing the throughput, processing a 64 Byte data packet takes 67.2 ns. Software-based network function applications rely on central processing units (CPUs) to process data packets. Since a CPU is typically designed for general purpose computation, a simple packet operation, such as layer 3 packet forwarding, takes about 75 CPU cycles (approximately 34 ns). In such case, the computing capacity of the CPU may be sufficient. However, a complicated packet operation, such as packet encryption, can take about 2300 clock cycles (approximately 950 ns), and thus requires plural CPU cores to work together for optimal performance. For a greater link bandwidth, such as 40 Gbps, or even 100 Gbps, the number of required CPU cores may be much greater than what a single server can afford.

Therefore, realizing network functions on FPGAs (Field Programmable Gate Arrays) has been proposed as a solution. FPGAs are advantageously reconfigurable. By dynamically configuring the logic combinations of their gate arrays, different hardware functions can be realized. FPGAs have the advantages of low energy consumption and high performance. Nevertheless, the prior art fails to make the best use of FPGA resources, resulting in limited actual utilization level.

SUMMARY

For addressing the shortcomings of the prior art, the present invention provides an FPGA-based method and system for network function accelerating, which effectively solve the problems of the prior art about high CPU core occupancy, low throughput, and low actual utilization level of FPGAs. The present invention thus improves the performance of computer systems through the effective use of FPGA-based methods and systems.

The present invention provides an FPGA-based method for network function accelerating. The method comprises: building a network function accelerating system that includes a physical machine and an accelerator card, the physical machine and the accelerator card being connected through a PCIe channel, the physical machine including a processor, the accelerator card including an FPGA, the accelerator card serving to provide network function accelerating for the processor; the processor determining, at a time when it requires the accelerator card to provide network function accelerating, whether there is any required accelerator module present in the FPGA, and if yes, acquire an accelerating function identification (ID) corresponding to the required accelerator module, and if not, select at least one partial reconfigurable region in the FPGA and configure it into the required accelerator module and generate a corresponding accelerating function ID; and/or sending an accelerating request to the FPGA, wherein the accelerating request includes a to-be-processed data packet and the accelerating function ID; and configuring the FPGA to: according to the accelerating function ID, send the accelerating request to the required accelerator module for acceleration.

According to a preferred mode, the step of selecting at least one partial reconfigurable region in the FPGA and configuring it into the required accelerator module and generating the corresponding accelerating function ID comprises: determining whether there is at least first-type partial reconfigurable region in the system meeting configuration requirements, and if yes, selecting and configuring the at least one first-type partial reconfigurable region, and if not, determining whether there is at least one second-type partial reconfigurable region in the system meeting the configuration requirements, and if yes, selecting and configuring at the least one second-type partial reconfigurable regions, and if not, transiting the accelerator module, so as to provide said to-be-processed data packet with the partial reconfigurable region that meets the configuration requirements; wherein the first-type partial reconfigurable region is an un-configured partial reconfigurable region, and the second-type partial reconfigurable region is a configured partial reconfigurable region whose use frequency is smaller than a first threshold and/or which has not been used for a duration longer than a second threshold.

According to a preferred mode, the processor is further configured to: in the step of selecting and configuring at least one said first-type partial reconfigurable region, select the smallest function block in the first-type partial reconfigurable region; and/or in the step of selecting and configuring at least one said second-type partial reconfigurable regions, select the smallest function block in the second-type partial reconfigurable region.

According to a preferred mode, the step of transiting the accelerator module includes: determining whether it is possible to provide the required accelerator module with the partial reconfigurable region meeting the configuration requirements by transiting the accelerator module, and if yes, transiting the to-be-transited accelerator module that is located in an initial partial reconfigurable region to a target partial reconfigurable region, and if not, repartitioning the partial reconfigurable region.

According to a preferred mode, the step of repartitioning the partial reconfigurable region includes: determining whether it is possible to provide the required accelerator module with the partial reconfigurable region that meets the configuration requirements by repartitioning the partial reconfigurable region, and if yes, transiting the accelerator module in the FPGA to be repartitioned to another FPGA or temporarily passing the to-be-processed data packet in the accelerating request to the physical machine for processing, and then initializing the FPGA to be repartitioned, wherein when the initialization is performed, the FPGA to be repartitioned loads a new frame file when it is powered on so as to provide the required accelerator module with the partial reconfigurable region that meets the configuration requirements, and if not, determining that the accelerating request fails, and passing the to-be-processed data packet in the accelerating request to the physical machine for processing.

According to a preferred mode, the accelerator card contains plural to-be-optimized FPGAs that have different minimum partition granularities and whose actual partition granularities do not reach the minimum partition granularities thereof.

According to a preferred mode, the processor is further configured to: when each said partial reconfigurable region in the system has a first utilization level greater than a third threshold and has a first actual resource utilization level smaller than a fourth threshold, according to an ascending order of the minimum partition granularities, successively optimizing the actual partition granularities of the corresponding to-be-optimized FPGAs until the first actual resource utilization levels are greater than a fifth threshold or until the actual partition granularity optimization of the last to-be-optimized FPGA has been completed, wherein the fourth threshold is smaller than or equal to the fifth threshold.

According to a preferred mode, the step of optimizing the actual partition granularity includes: determining whether it is possible to make a second utilization level of the present to-be-optimized FPGA greater than or equal to a sixth threshold and make a second actual resource utilization level of the present to-be-optimized FPGA greater than or equal to a seventh threshold by partitioning the actual partition granularity of the present to-be-optimized FPGA to its corresponding minimum partition granularity, and then transiting the accelerator modules in other FPGAs having greater actual partition granularities to the present to-be-optimized FPGA in a manner that meets the configuration requirements and in a descending order of third resource utilization levels of individual partial reconfiguration regions, and if yes, partitioning the present to-be-optimized FPGA into its corresponding minimum partition granularity, and if not, maintaining the original actual partition granularity of the present to-be-optimized FPGA and according to said order taking the next to-be-optimized FPGA as the present to-be-optimized FPGA and repeating the previous step.

The present invention further discloses an FPGA-based system for network function accelerating. The system includes a physical machine and an accelerator card, the physical machine and the accelerator card being connected through a PCIe channel, the physical machine including a processor, the accelerator card including an FPGA, the accelerator card serving to provide network function accelerating for the processor; the processor being configured to: when it requires the accelerator card to provide the network function accelerating, check whether there is any required accelerator module in the FPGA, and if yes, acquire an accelerating function ID corresponding to the required accelerator module, and if not, select at least one partial reconfigurable region in the FPGA and configure it into the required accelerator module and generate a corresponding accelerating function ID; and/or sending an accelerating request to the FPGA, wherein the accelerating request includes a to-be-processed data packet and the accelerating function ID; and the FPGA being configured to: according to the accelerating function ID, send the accelerating request to the required accelerator module for acceleration.

According to a preferred mode, the step of selecting at least one partial reconfigurable region in the FPGA and configuring it into the required accelerator module and generating the corresponding accelerating function ID comprises: determining whether there is at least one first-type partial reconfigurable region in the system meeting configuration requirements, and if yes, selecting and configuring the at least one first-type partial reconfigurable region, and if not, determining whether there is at least one second-type partial reconfigurable region in the system meeting the configuration requirements, and if yes, selecting and configuring the at least one second-type partial reconfigurable regions, and if not, transiting the accelerator module, so as to provide said to-be-processed data packet with the partial reconfigurable region that meets the configuration requirements; wherein the first-type partial reconfigurable region is an un-configured partial reconfigurable region, and the second-type partial reconfigurable region is a configured partial reconfigurable region whose use frequency is smaller than a first threshold and/or which has not been used for a duration longer than a second threshold.

The FPGA-based method and system for network function accelerating of present invention at least have the following benefits:

(1) The present invention provides accelerating services for the CPU of the physical machine through the FPGA, effectively improving the data processing capacity and throughput of the physical machine, and reducing core occupancy of the processor of the physical machine; and (2) The present invention supports online reconfiguration of accelerator modules in FPGAs, so that online reconfiguration can be performed for un-configured or low-utilization partial reconfigurable regions without adversely affecting other accelerator modules.

DETAILED DESCRIPTION

The following description, in conjunction with the accompanying drawings and preferred embodiments, is set forth as below to illustrate the present invention.

It is noted that, for easy understanding, like features bear similar labels in the attached figures as much as possible.

As used throughout this application, the term "may" is of permitted meaning possibly) but not compulsory meaning (i.e., essentially). Similarly, the terms "comprising", "including" and "consisting" mean "comprising but not limited to".

The phrases "at least one", "one or more" and "and/or" are for open expression and shall cover both connected and separate operations. For example, each of "at least one of A, B and C", "at least one of A, B or C", "one or more of A, B and C", "A, B or C" and "A, B and/or C" may refer to A solely, B solely, C solely, A and B, A and C, B and C or A, B and C.

The term "a" or "an" article refers to one or more articles. As such, the terms "a" (or "an"), "one or more" and "at least one" are interchangeable herein. It is also to be noted that the term "comprising", "including" and "having" used herein are interchangeable.

Some terms referred to in the present invention are defined first as below.

A physical machine is a physically existing computer compared to a virtual machine. A physical machine provides a virtual machine with a hardware environment, and is sometimes referred to as a "host".

An FPGA represents a field programmable gate array. It appears as a semicustom circuit used in an application-specific integrated circuit (ASIC), being advantageous for not only addressing the shortcomings of custom circuit, but also overcoming the defects of programmable devices about their limited gate circuits. The final FPGA product may have its logic block and connection adapted to design requirements even after leaving the factory. In use, the logic gates in the FPGA may be connected using its editable connection according to practical needs, so as to accomplish the required logic functions.

A network function module is the first virtual machine built in a physical machine. The network function module serves to provide network function accelerating for corresponding programs.

An accelerating function management module is the second virtual machine built in a physical machine. The second virtual machine manages accelerating function, such as managing the first virtual machine.

Embodiment 1

The present embodiment discloses an FPGA-based method and system for network function accelerating. Without causing conflicts or contradictions, the preferred modes for other embodiments may be incorporated into the present embodiment as supplement.

The present invention provides an FPGA-based method for network function accelerating. The method comprises; building a network function accelerating system that includes a physical machine A and an accelerator card B, the physical machine A and the accelerator card B being connected through a peripheral component interconnect express (PCIe) channel, the physical machine A including a processor, the accelerator card B including an FPGA, the accelerator card B serving to provide network function accelerating for the processor; configuring the processor to: when it requires the accelerator card to provide the network function accelerating, check whether there is any required accelerator module present in the FPGA, and if yes, acquire an accelerating function ID corresponding to the required accelerator module, and if not, select at least one partial reconfigurable region B1 in the FPGA and configure it into the required accelerator module and generate a corresponding accelerating function ID; and/or sending an accelerating request to the FPGA, wherein the accelerating request includes a to-be-processed data packet and the accelerating function ID; and configuring the FPGA to: according to the accelerating function ID, send the accelerating request to the required accelerator module for acceleration.

According to a preferred mode, the step of selecting at least one partial reconfigurable region B1 in the FPGA and configuring it into the required accelerator module and generating the corresponding accelerating function ID comprises: determining whether there is any first-type partial reconfigurable region in the system meeting configuration requirements, and if yes, selecting and configuring at least one said first-type partial reconfigurable region, and if not, determining whether there is any second-type partial reconfigurable region in the system meeting the configuration requirements, and if yes, selecting and configuring at least one said second-type partial reconfigurable regions, and if not, transiting the accelerator module, so as to provide said to-be-processed data packet with the partial reconfigurable region that meets the configuration requirements; wherein the first-type partial reconfigurable region is an un-configured partial reconfigurable region, and the second-type partial reconfigurable region is a configured partial reconfigurable region whose use frequency is smaller than a first threshold and/or which has not been used for a duration longer than a second threshold.

According to a preferred mode, the processor is further configured to: in the step of selecting and configuring at least one said first-type partial reconfigurable region, select the smallest function block in the first-type partial reconfigurable region; and/or in the step of selecting and configuring at least one said second-type partial reconfigurable regions, select the smallest function block in the second-type partial reconfigurable region.

According to a preferred mode, the step of transiting the accelerator module includes: determining whether it is possible to provide the required accelerator module with the partial reconfigurable region meeting the configuration requirements by transiting the accelerator module, and if yes, transiting the to-be-transited accelerator module that is located in an initial partial reconfigurable region to a target partial reconfigurable region, and if not, repartitioning the partial reconfigurable region.

According to a preferred mode, the step of repartitioning the partial reconfigurable region includes: determining whether it is possible to provide the required accelerator module with the partial reconfigurable region that meets the configuration requirements by repartitioning the partial reconfigurable region, and if yes, transiting the accelerator module in the FPGA to be repartitioned to another FPGA or temporarily passing the to-be-processed data packet in the accelerating request to the physical machine A for processing, and then initializing the FPGA to be repartitioned, wherein when the initialization is performed, the FPGA to be repartitioned loads a new frame file when it is powered on so as to provide the required accelerator module with the partial reconfigurable region that meets the configuration requirements, and if not, determining that the accelerating request fails, and passing the to-be-processed data packet in the accelerating request to the physical machine A for processing.

According to a preferred mode, accelerator card B contains plural to-be-optimized FPGAs that have different minimum partition granularities and whose actual partition granularities do not reach minimum partition granularities thereof.

According to a preferred mode, the processor is further configured to: when each said partial reconfigurable region in the system has a first utilization level greater than a third threshold and has a first actual resource utilization level smaller than a fourth threshold, according to an ascending order of the minimum partition granularities, successively optimizing the actual partition granularities of the corresponding to-be-optimized FPGAs until the first actual resource utilization levels are greater than a fifth threshold or until the actual partition granularity optimization of the last to-be-optimized FPGA has been completed, wherein the fourth threshold is smaller than or equal to the fifth threshold.

According to a preferred mode, the step of optimizing the actual partition granularity includes: determining whether it is possible to make a second utilization level of the present to-be-optimized FPGA greater than or equal to a sixth threshold and make a second actual resource utilization level of the present to-be-optimized FPGA greater than or equal to a seventh threshold by partitioning the actual partition granularity of the present to-be-optimized FPGA to its corresponding minimum partition granularity, and then transiting the accelerator modules in other FPGAs having greater actual partition granularities to the present to-be-optimized FPGA in a manner that meets the configuration requirements and in a descending order of third resource utilization levels of individual partial reconfiguration regions, and if yes, partitioning the present to-be-optimized FPGA into its corresponding minimum partition granularity, and if not, maintain the original actual partition granularity of the present to-be-optimized FPGA and according to said order taking the next to-be-optimized FPGA as the present to-be-optimized FPGA and repeating the previous step.

The present embodiment further discloses an FPGA-based system for network function accelerating. The system is suitable for performing the steps of the method of the present invention so as to achieve the expected technical effects.

Figure 1:
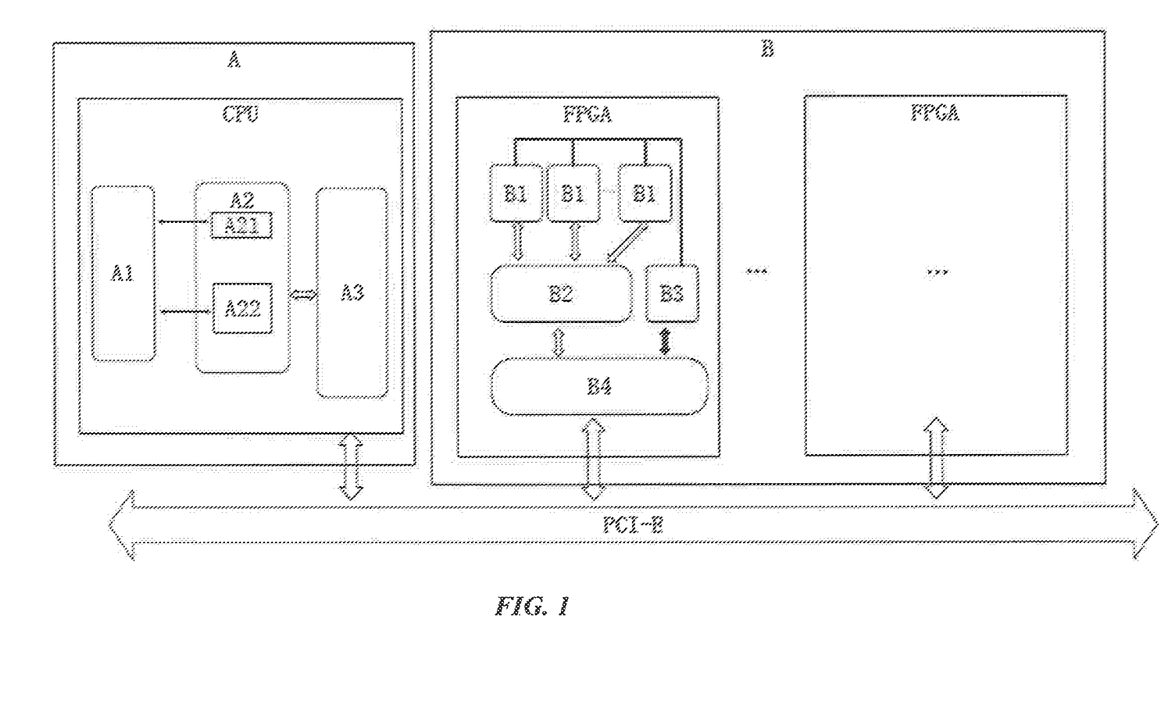
FIG. 1 is a modular diagram showing a preferred mode of a system according to the present invention.

According to a preferred mode, as shown in FIG. 1, the system includes a physical machine A and an accelerator card B, the physical machine A and the accelerator card B being connected through a PCIe channel, the physical machine A including a processor or CPU, the accelerator card B including an FPGA, the accelerator card B serving to provide network function accelerating for the processor; the processor being configured to: when it requires the accelerator card to provide the network function accelerating, check whether there is any required accelerator module present in the FPGA, and if yes, acquire an accelerating function ID corresponding to the required accelerator module, and if not, select at least one partial reconfigurable region B1 in the FPGA and configure it into the required accelerator module and generate a corresponding accelerating function ID; and/or sending an accelerating request to the FPGA, wherein the accelerating request includes a to-be-processed data packet and the accelerating function ID; and the FPGA being configured to: according to the accelerating function ID, send the accelerating request to the required accelerator module for acceleration.

According to a preferred mode, the step of selecting at least one partial reconfigurable region B1 in the FPGA and configuring it into the required accelerator module and generating the corresponding accelerating function ID comprises: determining whether there is any first-type partial reconfigurable region in the system meeting configuration requirements, and if yes, selecting and configuring at least one said first-type partial reconfigurable region, and if not, determining whether there is any second-type partial reconfigurable region in the system meeting the configuration requirements, and if yes, selecting and configuring at least one said second-type partial reconfigurable regions, and if not, transiting the accelerator module, so as to provide said to-be-processed data packet with the partial reconfigurable region that meets the configuration requirements; wherein the first-type partial reconfigurable region is an un-configured partial reconfigurable region, and the second-type partial reconfigurable region is a configured partial reconfigurable region whose use frequency is smaller than a first threshold and/or which has not been used for a duration longer than a second threshold.

Embodiment 2

The present embodiment is further improvement based on Embodiment 1, and the repeated description is omitted herein. Without causing conflicts or contradictions, the preferred modes for other embodiments may be incorporated into the present embodiment as supplement.

Figure 2:
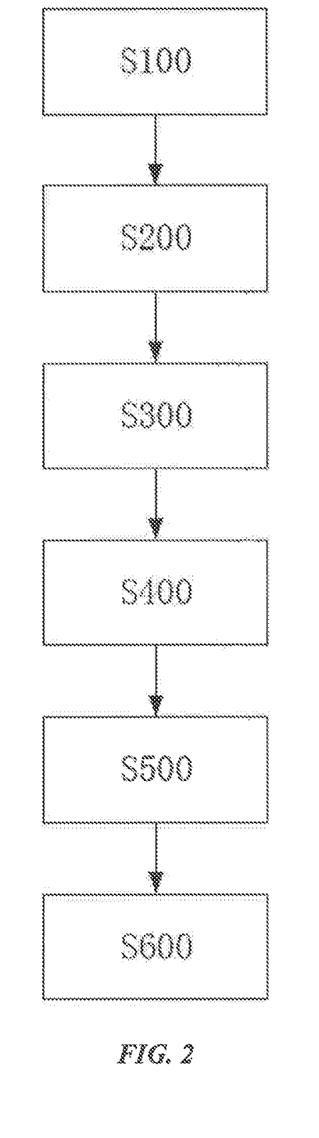
FIG. 2 is a flowchart of a preferred mode of a method according to the present invention.

According to a preferred mode, as shown in FIG. 2, the disclosed method may comprise: Step S100, building a network function accelerating system, which may comprise a physical machine A and an accelerator card B. The physical machine A and the accelerator card B are connected through a PCIe channel. The accelerator card B includes an FPGA. Preferably, the physical machine A may be provided with an accelerating function management module A3. Preferably, the accelerating function management module A3 may be a virtual machine operating in the physical machine A. Alternatively, the accelerating function management module A3 may be an independent hardware device connected to the physical machine A through data interface. Preferably, the network function module A2 serves to receive data packets from a to-be-accelerated software program A1 in the physical machine. Preferably, the physical machine may be at least one of a server, a server cluster, a workstation, a desktop computer, and a laptop computer. Preferably, the accelerator card may further carry another accelerator module in addition to the FPGA, such as at least one of a GPU, an ASIC and a GPDSP. Preferably, the FPGA may be at least one from Series Virtex 7, UltraScale and UltraSCALE$^+$ of Xilinx, and Series Arria and Stratix of Altera.

Preferably, the disclosed method may further comprise: Step S200, wherein upon receiving a service configuration instruction, the physical machine A generates a network function module A2, and the network function module A2 sends the registering request to the accelerating function management module A3. As the accelerating function management module A3 is adopted, it is supported to run plural network function modules A2 in the same physical machine A simultaneously. Different network function modules A2 have their own separate, independent data path respectively, thereby maximizing resource utilization and utilization of the physical machine A. Preferably, the plural network function modules A2 may provide accelerating service for different software programs and/or progresses. Preferably, the registering request may be sent before the network function module A2 sends the accelerating request to the accelerating function management module A3, so as to speed up processing of the subsequent accelerating requests. This approach may be used when there are more idle computation resources and communication resources in the system. Alternatively, the registering request may be sent after the network function module A2 sends the accelerating request to the accelerating function management module A3. In this way, the registering request is only addressed when acceleration is needed, so as to avoid unnecessary communication and computation costs. This approach may be used especially when the system is tight in terms of computation resource and communication resource.

Preferably, the disclosed method may further comprise: Step S300, wherein after the registering request is accepted, the network function module A2 cheeks whether there is any accelerator module required by the network function module A2 present in the FPGA, and if yes, acquires an accelerating function ID corresponding to the required accelerator module, and if not, the accelerating function management module A3 selects at least one partial reconfigurable region B1 in the FPGA and configures it as the required accelerator module to generate a corresponding accelerating function ID.

Preferably, the disclosed method may further comprise: Step S400, wherein the network function module A2 sends the accelerating request to the accelerating function management module A3, wherein the accelerating request includes a to-be-processed data packet and the accelerating function ID.

Preferably, the disclosed method may further comprise: Step S500, wherein the accelerating request is sent to the required accelerator module for acceleration according to the accelerating function ID.

Preferably, the disclosed method may further comprise: Step S600, wherein the required accelerator module sends the processed data back to the corresponding network function module A2 through the accelerating function management module.

According to a preferred mode, the step in which the accelerating function management module A3 selects at least one partial reconfigurable region in the FPGA and configures it into the required accelerator module may comprise: determining whether there is any first-type partial reconfigurable region in the system meeting configuration requirements, and if yes, selecting and configuring at least one said first-type partial reconfigurable region, and if not, determining whether there is any second-type partial reconfigurable region in the system meeting the configuration requirements, and if yes, selecting and configuring at least one said second-type partial reconfigurable regions, and if not, transiting the accelerator module, so as to provide said to-be-processed data packet with the partial reconfigurable region that meets the configuration requirements. Preferably, the first-type partial reconfigurable region is an un-configured partial reconfigurable region. Preferably, the second-type partial reconfigurable region is a configured partial reconfigurable region whose use frequency is smaller than a first threshold and/or which has not been used for a duration longer than a second threshold. In the present invention, it is first to determine whether there is any first-type partial reconfigurable region in the system, and then to determine whether there is any second-type partial reconfiguration region, so as to reserve the second-type partial reconfigurable regions that have been configured yet not used for long in the system for later use when there are plentiful un-configured resources in the partial reconfigurable region, thereby reducing the overall accelerating time when accelerator modules configured with the second-type partial reconfigurable region are required by programs next time, and improving the accelerating efficiency of the present invention on the whole. Preferably, in the present invention, the second-type partial reconfigurable region is a configured partial reconfigurable region whose use frequency is smaller than a first threshold or which has not been used for a duration longer than a second threshold. In this way, the configured partial reconfigurable regions that are of low use frequency or have not be frequently used recently can be screened out, so as to reduce situations that configured partial reconfigurable regions in the system corresponding to accelerator modules that are busy with accelerating tasks are reconfigured, resulting in the accelerator modules being reconfigured in other partial reconfigurable regions, thus improving the accelerating efficiency of the system. More preferably, the second-type partial reconfigurable regions in the present invention are configured partial reconfigurable regions whose use frequency is smaller than a first threshold and which has not been used for a duration longer than a second threshold. This sets a stricter requirement for selecting the second-type partial reconfigurable regions, and thereby provides better performance in reducing repeated configurations as compared to the previous approach, further improving the accelerating efficiency of the system.

According to a preferred mode, in the step of selecting at least one of the first-type partial reconfigurable regions for configuration, what is selected is the smallest function block in the first-type partial reconfigurable regions. Preferably, in the step of selecting at least one of the second-type partial reconfigurable regions, what is selected is the smallest function block in the second-type partial reconfigurable regions. There may be function blocks of different sizes in the first-type and second-type partial reconfigurable regions. The greater the function block is, the more logic gates it includes, and the configuration requirements for more accelerator modules can be satisfied. Therefore, on the premise that the configuration requirements have been satisfied, by preferentially selecting and using the smallest function block, the utilization of the system resource can be improved and the subsequent transition as well as reparation in the system can be significantly reduced, which in turn reduces communication costs, computation costs, and configuration time, and enhances the performance and efficiency of the system.

According to a preferred mode, the step of transiting the accelerator module may comprise: determining whether it is possible to provide the required accelerator module with the partial reconfigurable region the meets the configuration requirements by transiting the network function module A2, and if yes, transiting the to-be-transited accelerator module that is located in an initial partial reconfigurable region to a target partial reconfigurable region, and if not, repartitioning the partial reconfigurable region. Preferably, when there is only one FPGA in the system, it is likely to transit an accelerator module occupying a larger partial reconfigurable region to a smaller partial reconfiguration region. Then the larger partial reconfigurable region is used for configuring the accelerator module required by the corresponding network function module A2. Preferably, the transition may be done in one FPGA. For example, an FPGA is divided into partial reconfigurable regions of different sizes. This helps to optimize the usage of one FPGA, thereby improving the utilization of individual FPGAs. Alternatively, the transition may be performed across different FPGAs. This allows transition of all accelerator modules in one FPGA to other FPGAs. The present invention first determines whether it is possible to provide the required accelerator module with the partial reconfigurable region meeting the requirements of configuration by transiting the accelerator module, and only when the configuration requirements cannot be satisfied, the partial reconfigurable region is repartitioned. This is in view that repartitioning the partial reconfigurable region involves more steps and components and requires more configuration time, communication costs and computation costs as compared to pure transition. In this way, the number of repartition operations in the system can be reduced so as to further improve the efficiency of the system and reduce energy consumption of the system.

According to a preferred mode, the step of repartitioning the partial reconfigurable region may comprise: determining whether it is possible to provide the accelerator module required by the network function module A2 with the partial reconfigurable region the meets the configuration requirements by repartitioning the partial reconfigurable region, and if yes, transiting the accelerator module in the FPGA to be repartitioned to another FPGA or temporarily passing the to-be-processed data: packet in the accelerating request to the physical machine A for processing, and then initializing the FPGA to be repartitioned, wherein when the initialization is performed, the FPGA to be repartitioned loads a new frame file when it is powered on so as to provide the network function module A2 with the partial reconfigurable region the meets the configuration requirements, and if not, determining that the accelerating request of the network function module A2 fails, and passing the to-be-processed data packet in the accelerating request to the physical machine A for processing. In this way, when there are neither first-type nor second-type partial reconfigurable regions in the system, by changing the partition scheme for the FPGA to be repartitioned, current accelerating requirements can be satisfied without adding new FPGAs, and the resource utilization of the system can be improved. Preferably, before repartitioning the partial reconfigurable region, the system first check whether the user wants to repartition the partial reconfigurable regions of the corresponding FPGA, and if yes, it repartitions the partial reconfigurable regions, and if not, it determines that the accelerating request of the network function module A2 fails, and passes the to-be-processed data packet in the accelerating request to the physical machine A for processing. In this way, when the user has a stricter requirement on repartition scheme, it is up to the user to decide whether or not to change the partition scheme of the corresponding FPGA. Especially, when the user has the knowledge that the corresponding FPGA will soon be used to perform acceleration, this can reduce the probability that automatic change in the partition scheme brings about the need of manual adjustment by the user later, and thereby improve the control of the user to the change in the partition scheme. Preferably, an FPGA includes a static region and a reconfigurable region. The static region of an FPGA may be pre-stored with at least two frame files. Different frame files have different partition schemes. When the FPGA is installed in the system, the system may first read the frame files in the static region of the FPGA and store the files in a manner associated with the FPGA. Before repartition, the system uses all the frame files to determine which FPGA can after partition provide the partial reconfigurable regions as required by configuration. Afterward, it takes one of them as the FPGA to be repartitioned, and requires and/or makes a setting that when the FPGA is powered on, the corresponding new frame files are loaded. This helps to save computation costs for repartition, and lower the needs and difficulty for the system to perform configuration. Alternatively, as a feasible solution, when an FPGA is installed in the system, the system first reads the frame file in the static region of the FPGA and characteristic parameters of the FPGA. The characteristic parameters may comprise: the minimum partition granularity supported by the FPGA, the type and number of the logic gates in the regions corresponding to the minimum partition granularity, the total number of the regions corresponding to the minimum partition granularity. The system may, according to the partition scheme and/or characteristic parameters provided by the manufacturer, load new frame files when the corresponding FPGA is powered on.

According to a preferred mode, the accelerator card B contains plural to-be-optimized FPGAs that have different minimum partition granularities and whose actual partition granularities do not reach the minimum partition granularities thereof. As R&D and manufacturing of FPGAs are in ongoing progress, it is likely that a user bought FPGAs having different minimum partition granularities over a period of time and has installed them into one system. Preferably, an FPGA has its actual partition granularity aligned with the actual size of the reconfigurable regions partitioned after the frame files are loaded. The minimum partition granularity of an FPGA corresponds to the size of the smallest possible reconfigurable regions partitioned in that FPGA.

According to a preferred mode, the disclosed method may further comprise: when each said partial reconfigurable region in the system has a first utilization level greater than a third threshold and has a first actual resource utilization level smaller than a fourth threshold, according to an ascending order of the minimum partition granularities successively optimizing the actual partition granularities of the corresponding to-be-optimized FPGAs until the first actual resource utilization levels are greater than a fifth threshold or until actual partition granularity optimization of the last to-be-optimized FPGA has been completed. Preferably, the fourth threshold is smaller than or equal to the fifth threshold. Preferably, the first utilization level and first actual resource utilization level are both regarding to all the partial reconfigurable regions in the system. That is, they include the partial reconfigurable regions of all the FPGAs in the system. Preferably, the first utilization level is the ratio of the number of the configured partial reconfigurable regions in the system to the number of all the partial reconfigurable regions in the system. Preferably, the first actual resource utilization may be a ratio of the number of the logic devices actually used for forming the accelerator modules in the configured partial reconfigurable regions in the system to the total number of the logic devices of all partial reconfigurable regions in the system. For example, the first actual resource utilization may be the ratio of the number of the logic gates actually used in the configured partial reconfigurable regions of the system to the total number of the logic gates of all the partial reconfigurable regions of the system. However, where a region corresponding to the minimum partition granularity includes plural logic gates, and only one of these logic gates is used by the corresponding accelerator module, since the region corresponding to the minimum partition granularity is entirely assigned to the partial reconfigurable region, in this case, the other logic gates in the region corresponding to the minimum partition granularity should also be counted as actually used. In other words, the first actual resource utilization level may be the ratio of the number of the regions corresponding to the actually used finest partition granularity in the configured partial reconfigurable regions of the system to the total number of the regions corresponding to the minimum partition granularity of all the partial reconfigurable regions of the system.

According to a preferred mode, the step of optimizing the actual partition granularity may comprise: determining whether it is possible to make a second utilization level of the present to-be-optimized FPGA greater than or equal to a sixth threshold and make a second actual resource utilization level of the present to-be-optimized FPGA greater than or equal to a seventh threshold by partitioning the actual partition granularity of the present to-be-optimized FPGA to its corresponding minimum partition granularity, and then transiting the accelerator modules in other FPGAs having greater actual partition granularities to the present to-be-optimized FPGA in a manner that meets the configuration requirements and in a descending order of third resource utilization levels of individual partial reconfiguration regions, and if yes, partitioning the present to-be-optimized FPGA into its corresponding minimum partition granularity, and if not, maintaining the original actual partition granularity of the present to-be-optimized FPGA and according to said order taking the next to-be-optimized FPGA as the present to-be-optimized FPGA and repeating the previous step. FPGAs with smaller minimum partition granularities are usually manufactured with more advanced technology or made of better hardware resources, and thus require higher costs. Nevertheless, these advanced FPGAs are usually installed in the system at a later time point. In view of this, optimization of the actual partition granularity performed in a chronological order would not leverage the hardware advantages of these FPGAs. Therefore, in the present invention, when there are FPGAs of various minimum partition granularities in the system, these FPGAs are used in an ascending order in terms of minimum partition granularity, so as to leverage the hardware advantages of the FPGAs with smaller minimum partition granularities and achieve optimal utilization level of the resources of the system.

For example, an accelerator card B includes a first FPGA and a second FPGA. The first FPGA has its first minimum partition granularity. The second FPGA has its second minimum partition granularity. The first actual partition granularity of the first FPGA does not reach the first minimum partition granularity. The second actual partition granularity of the second FPGA does not reach the second minimum partition granularity. In this case, it is assumed that there are only the two to-be-optimized FPGAs in the system.

At this time, it is first to determine whether it is possible to make the second utilization level of the first FPGA greater than or equal to a sixth threshold and make the second actual resource utilization level of the first FPGA greater than or equal to a seventh threshold by partitioning the actual partition granularity of the first FPGA equal to the first minimum partition granularity, and then transiting the accelerator modules in other FPGAs having greater actual partition granularities to the present to-be-optimized FPGA in a manner that meets the configuration requirements and in a descending order of third resource utilization levels of individual partial reconfiguration regions, and if yes, the first FPGA is partitioned using the first minimum partition granularity, and then it is to determine whether the first actual resource utilization level after this optimization of the actual partition granularity is greater than the fifth threshold, and
    if yes, the optimization of the actual partition granularity is ended, and
    if not, the actual partition granularity of the second FPGA is optimized following the foregoing steps; and
  if not, it is to determine whether it is possible to make the second utilization level of the second FPGA greater than or equal to a sixth threshold and make the second actual resource utilization level of second FPGA greater than or equal to a seventh threshold by partitioning the actual partition granularity of the second FPGA to the second minimum partition granularity, and then transiting the accelerator modules in other FPGAs having greater actual partition granularities to the second FPGA in a manner that conform to configuration requirements and in a descending order of third resource utilization levels of individual partial reconfiguration regions, and
    then it is to determine whether the first actual resource utilization level after this optimization of the actual partition granularity is greater than the fifth threshold, and
      if yes, the optimization of the actual partition granularity is ended, and
      if not, since the second FPGA is the last FPGA to be optimized, the optimization of the actual partition granularity is ended.

Embodiment 3

The present embodiment is further improvement based on Embodiments 1 and 2 and the combination thereof, and the repeated description is omitted herein. Without causing conflicts or contradiction, the preferred modes for other embodiments may be incorporated into the present embodiment as supplement.

According to a preferred mode, the disclosed method may further comprise a step wherein the accelerating function management module A3 associates the required accelerator modules with the corresponding network function modules A2.

According to a preferred mode, the network function modules A2 are software programs running in the physical machine A independently from each other, such as virtual machines. The network function module A2 may comprise a normal processing unit A21 and a compute-intensive unit A22. Preferably, different network function modules A2 each have its own independent normal processing unit A21 and compute-intensive unit A22. Computation of the data to be processed of the normal processing unit A21 is done by the physical machine A. Computation of the data to be processed of the compute-intensive unit A22 is done by a hardware processing logic, namely an FPGA. The accelerator module in the FPGA operates in the form of a hardware logic circuit. The partial reconfigurable regions are general processing logics and may be called by different network function modules A2.

According to a preferred mode, the network function module A2 may call an accelerator module configuration instruction to configure the partial reconfigurable regions on the FPGA into accelerator modules during operation. Preferably, a network function module A2 calls an accelerator module configuration instruction without affecting the accelerating request for a configured accelerator module made by another network function module A2.

Embodiment 4

The present embodiment is further improvement based on Embodiments 1, 2 and 3 and the combination thereof, and the repeated description is omitted herein. Without causing conflicts or contradiction, the preferred modes for other embodiments may be incorporated into the present embodiment as supplement.

The present invention further discloses an FPGA-based system for network function accelerating that is suitable for performing the steps of the method of the present invention, so as to achieve the expected technical effects.

The disclosed system may comprise a physical machine A and an accelerator card B. The physical machine A and the accelerator card B are connected through a PCIe channel. The accelerator card B includes an FPGA.

Preferably, upon receiving the service configuration instruction, the physical machine A generates a network function module A2, and the network function module A2 sends a registering request to the accelerating function management module A3.

Preferably, after the registering request is accepted, the network function module A2 checks whether there is any accelerator module present the FPGA required by the network function module A2. If yes, acquires an accelerating function ID corresponding to the required accelerator module. If not, the accelerating function management module A3 selects at least one partial reconfigurable region of the FPGA and configures it into the required accelerator module so as to generate a corresponding accelerating function ID.

Preferably, the network function module A2 sends the accelerating request to the accelerating function management module A3, wherein the accelerating request includes a to-be-processed data packet and the accelerating function ID.

Preferably, the accelerating request is sent to the required accelerator module for acceleration according to the accelerating function ID.

According to a preferred mode, the step where the accelerating function management module A3 selects the accelerator module required by configuration of at least one partial reconfigurable region in the FPGA may further comprise: determining whether there is any first-type partial reconfigurable region in the system meeting configuration requirements, and if yes, selecting and configuring at least one said first-type partial reconfigurable region, and if not, determining whether there is any second-type partial reconfigurable region in the system meeting the configuration requirements, and if yes, selecting and configuring at least one said second-type partial reconfigurable regions, and if not, transiting the accelerator module, so as to provide said to-be-processed data packet with said partial reconfigurable region that meets the configuration requirements, wherein the first-type partial reconfigurable region is an un-configured partial reconfigurable region, and the second-type partial reconfigurable region is a configured partial reconfigurable region whose use frequency is smaller than a first threshold and/or which has not been used for a duration longer than a second threshold.

Embodiment 5

The present embodiment is further improvement based on Embodiments 1, 2, 3 and 4 and the combination thereof, and the repeated description is omitted herein. Without causing conflicts or contradiction, the preferred modes for other embodiments may be incorporated into the present embodiment as supplement.

According to a preferred mode, the network function accelerating system includes a physical machine A and an FPGA. The physical machine A and the FPGA are connected through a PCI-e. Preferably, there are plural network function modules A2 and accelerating function management modules A3 running on the physical machine A.

Preferably, the FPGA may be configured to: load the FPGA static configuration file when powered on, and initialize the high-speed DMA module B4, an internal reconfiguration module B3, and an accelerating function router module B2 and equip it with N partial reconfigurable regions. Therein, the high-speed DMA module B4, the internal reconfiguration module B3, and the accelerating function router module B2 are static function regions in the FPGA. The N partial reconfigurable regions are dynamically configurable regions in the FPGA, and N is a positive integer greater than or equal to 1. In some past literatures, the partial reconfigurable region is referred to as a PR region.

Preferably, a high-speed DMA module B4 may be used for data transmission. For example, the accelerator module configuration files that the accelerating function management module A3 transmits to the FPGA, the data that the network function module A2 needs to call accelerating function to process, the information that the accelerating function management module A3 reads about the state of the FPGA and the data processed by the accelerator module. The accelerator module is the form of a partial reconfigurable module that has accelerating function logic after configuration.

Preferably, the internal reconfiguration module B3 may be used to configure the partial reconfigurable regions. For example, the internal reconfiguration module B3 receives the configuration instructions of the accelerating function management module A3 and related accelerator module configuration files through ICAP (Internal Configuration Access Port) interface, so as to configure a partial reconfigurable region, making the selected partial reconfigurable region capable of processing data and acting as an accelerator module.

Preferably, the internal reconfiguration module B3 may further serve to: when configuring the partial reconfigurable region, generate route entries based on the correspondence between the accelerating function IDs and the accelerator modules, and add them into the accelerating function router module B2.

Preferably, the accelerating function router module B2 may serve to route the data to be accelerated to the accelerator module. For example, by looking up the route entries, it routes the data to be accelerated to the accelerator module according to the accelerating function ID of the data to be accelerated that have been transmitted to the FPGA by the DMA high-speed module.

Preferably, the network function module A2 may serve to: make registration at the accelerating function management module A3 so as to acquire an exclusive network function ID, and calls the accelerator module configuration API of the accelerating function management module A3, thereby loading the required accelerator module to the FPGA.

Preferably, the network function module A2 may further serve to receive network data packets through the network interface card of the physical machine A where it is in, and perform corresponding data packet processing according to its network function. Therein, the normal processing unit A21 is a software programming code that can be run in the general CPU of the physical machine A. The compute-intensive unit A22 sends an accelerating request, adds a network function module A2 ID and an accelerator module ID in the data to be accelerated and then calls the accelerating request API provided by the accelerating function management module A3, thereby transmit the data to the FPGA for computation.

Preferably, the accelerating function management module A3 may serve to: manage the network function module A2, and assign each registered network function with an exclusive network function module A2 ID.

Preferably, the accelerating function management module A3 may further serve to: receive an inquiring accelerator module instruction of the network function module A2, and if the accelerator module does exist, return the corresponding accelerator module ID.

Preferably, the accelerating function management module A3 may further serve to: receive an adding accelerator module configuration file instruction of the network function module A2, and adds an accelerator module configuration file to the accelerator module configuration file database.

Preferably, the accelerating function management, module A3 may further serve to: receive a configuration instruction of the network function module A2, send the designated accelerator module configuration file to the internal reconfiguration module B3 through the high-speed DMA module B4 by checking the accelerator module configuration file database, and assign the configured accelerator module with an exclusive accelerating function ID.

Embodiment 6

The present embodiment is further improvement based on Embodiments 1, 2, 3, 4 and 5 and the combination thereof, and the repeated description is omitted herein. Without causing conflicts or contradiction, the preferred modes for other embodiments may be incorporated into the present embodiment as supplement.

According to a preferred mode, the accelerating function management module provides the accelerating function management module API for the network function module to configure the accelerator module and/or call the accelerator module. Preferably, the accelerating function management module API may comprise a configuration API and a data transmission API.

Preferably, the configuration API may comprise:
a network function module registration API (Register), through which the network function module make registration at the accelerating function management module;
an accelerator module search API (Search_by_name), through which the network function module looks up the required accelerator module ID;
an accelerator module addition API (Add_PR), through which the network function module adds an accelerator module configuration file to the accelerator module configuration file database; and
an accelerator module configuration API (Load_PR), through which the network function module configures the required accelerator module.

Preferably, the data transmission API may comprise:
a network function module sending data API (Send_data), through which the network function module sends the data to be processed by the accelerator module to the accelerator card of the FPGA; and
a network function module receiving data API (Receive_data), through which the network function module receives the data processed by the FPGA accelerator card.

It is to be noted that the APIs recited herein are only some examples, and people skilled in the art may optionally add other APIs according to functional needs.

According to a preferred mode, before the network function module performs specific network functions, it has to call the network function registration API to make registration at the accelerator module manager, and the accelerator module manager sends back an exclusive network function ID.

According to a preferred mode, before the network function module performs specific network functions, if it is necessary to use the accelerator module in the FPGA accelerator card, the accelerator module search API has to be called first to check whether the required accelerator module has been configured in the system. If the configuration has been made, it directly sends back the required accelerator module ID. If there is not one, the accelerator module configuration API is called to configure the required accelerator module.

According to a preferred mode, when calling the accelerator module configuration API, the accelerator module manager selects an un-configured or presently not used partial reconfigurable region from the plural FPGA accelerator cards for configuration. Particularly, the accelerating function management module looks up the accelerator module configuration file database, and forwards the required accelerator module configuration file to the selected FPGA accelerator card through the high-speed DMA module, and configures the selected partial reconfigurable region using the internal reconfiguration module.

At the same time, the accelerating function management module adds the route entries corresponding to the accelerator module into the accelerating function router module, so that the high-speed DMA module can route the data transmitted through the PCI-e to the corresponding partial reconfigurable regions by looking up the route entries. The route entries reflect mapping relationship between the accelerating function IDs and the partial reconfigurable regions. The accelerating function ID is generated by the accelerating function management module.

According to a preferred mode, the network function module may call the accelerator module addition API, and add accelerator module configuration file to the accelerator module configuration file database. The configuration file is a pre-encoded partial reconfigurable binary bit file.

According to a preferred mode, during operation, the network function module calls the network function module sending data API, so as to send the accelerating request to the accelerating function management module. The accelerating request contains the data to be accelerated. The network function module prepares the data to be accelerated, and assigns its own network function module ID assigned during registration and the required accelerating function ID in the data to be accelerated.

According to a preferred mode, the accelerating function management module forwards the data to be accelerated in the accelerating request of the network function module to the FPGA accelerator card corresponding to the accelerating function ID through the high-speed DMA module.

According to a preferred mode, the accelerating function router module, according to the accelerating function ID designated in the accelerating request, looks up the route entries, and transmits the data to the corresponding accelerator module.

According to a preferred mode, the network function module at last receives the data processed by the accelerator module in the FPGA accelerator card by calling the network function module receiving data API.

What is claimed is:
1. An FPGA-based method for network function accelerating, comprises:
building a network function accelerating system that includes a physical machine A and an accelerator card connected through a PCIe channel, wherein the physical machine A includes a processor and the accelerator card B includes an FPGA, in which the accelerator card B serves to provide network function accelerating for the processor;
the processor, when it requires the accelerator care to provide network function accelerating, check whether there is any required accelerator module present in the FPGA, and if yes, acquire an accelerating function ID corresponding to the required accelerator module, and if not, select at least one partial reconfigurable region B1 in the FPGA and configure it into the required accelerator module and generate a corresponding accelerating function ID, and/or sending an accelerating request to the FPGA, wherein the accelerating request includes a to-be-processed data packet and the accelerating function ID, and
the FPGA, according to the accelerating function ID, send the accelerating request to the required accelerator module for acceleration, wherein the step of selecting at least one partial reconfigurable region B1 in the FPGA and configuring it into the required accelerator module and generating the corresponding accelerating function ID comprises:
determining whether there is any first-type partial reconfigurable region in the system meeting configuration requirements, and if yes, selecting and configuring at least one said first-type partial reconfigu- rable region, and if not, determining whether there is any second-type partial reconfigurable region in the system meeting the configuration requirements, and if yes, selecting and configuring at least one said second-type partial reconfigurable regions, and if not, transiting the accelerator module, so as to provide said to-be-processed data packet with the partial reconfigurable region that meets the configuration requirements, wherein the first-type partial reconfigurable region is an un-configured partial reconfigurable region, and the second-type partial reconfigurable region is a configured partial reconfigurable region whose use frequency is smaller than a first threshold and/or which has not been used for a duration longer than a second threshold.

2. The method of claim 1, wherein the processor is further configured to:
in the step of selecting and configuring at least one said first-type partial reconfigurable region, select the smallest function block in the first-type partial reconfigurable region; and/or
in the step of selecting and configuring at least one said second-type partial reconfigurable regions, select the smallest function block in the second-type partial reconfigurable region.

3. The method of claim 2, wherein the accelerator card B contains plural to-be-optimized FPGAs that have different minimum partition granularities and whose actual partition granularities do not reach the minimum partition granularities thereof.

4. The method of claim 3, wherein the processor is further configured to:
when each said partial reconfigurable region in the system has a first utilization level greater than a third threshold and has a first actual resource utilization level smaller than a fourth threshold, according to an ascending order of the minimum partition granularities, successively optimizing the actual partition granularities of the corresponding to-be-optimized FPGAs until the first actual resource utilization levels are greater than a fifth threshold or until the actual partition granularity optimization of the last to-be-optimized FPGA has been completed, wherein the fourth threshold is smaller than or equal to the fifth threshold.

5. The method of claim 4, wherein the step of optimizing the actual partition granularity comprises:
determining whether it is possible to make a second utilization level of the present to-be-optimized FPGA greater than or equal to a sixth threshold and make a second actual resource utilization level of the present to-be-optimized FPGA greater than or equal to a seventh threshold by partitioning the actual partition granularity of the present to-be-optimized FPGA to its corresponding minimum partition granularity, and then transiting the accelerator modules in other FPGAs having greater actual partition granularities to the present to-be-optimized FPGA in a manner that meets the configuration requirements and in a descending order of third resource utilization levels of individual partial reconfiguration regions, and if yes, partitioning the present to-be-optimized FPGA into its corresponding minimum partition granularity, and if not, maintaining the original actual partition granularity of the present to-be-optimized FPGA and according to said order taking the next to-be-optimized FPGA as the present to-be-optimized FPGA and repeating the previous step.

6. The method of claim 1, wherein the step of transiting the accelerator module includes:
determining whether it is possible to provide the required accelerator module with the partial reconfigurable region meeting the configuration requirements by transiting the accelerator module, and if yes, transiting the to-be-transited accelerator module that is located in an initial partial reconfigurable region to a target partial reconfigurable region, and if not, repartitioning the partial reconfigurable region.

7. The method of claim 6, wherein the step of repartitioning the partial reconfigurable region includes:
determining whether it is possible to provide the required accelerator module with the partial reconfigurable region that meets the configuration requirements by repartitioning, the partial reconfigurable region and if yes, transiting the accelerator module in the FPGA to be repartitioned to another FPGA or temporarily passing the to-be-processed data packet in the accelerating request to the physical machine A for processing, and then initializing the FPGA to be repartitioned, wherein when the initialization is performed, the FPGA to be repartitioned loads a new frame file when it is powered on so as to provide the required accelerator module with the partial reconfigurable region that meets the configuration requirements, and if not, determining that the accelerating request fails, and passing the to-be-processed data packet in the accelerating request to the physical machine A for processing.

8. The method of claim 7, wherein the accelerator card B contains plural to-be-optimized FPGAs that have different minimum partition granularities and whose actual partition granularities do not reach the minimum partition granularities thereof.

9. The method of claim 8, wherein the processor is further configured to:
when each said partial reconfigurable region in the system has a first utilization level greater than a third threshold and has a first actual resource utilization level smaller than a fourth threshold, according to an ascending order of the minimum partition granularities, successively optimizing the actual partition granularities of the corresponding to-be-optimized FPGAs until the first actual resource utilization levels are greater than a fifth threshold or until the actual partition granularity optimization of the last to-be-optimized FPGA has been completed, wherein the fourth threshold is smaller than or equal to the fifth threshold.

10. The method of claim 6, wherein the accelerator card B contains plural to-be-optimized FPGAs that have different minimum partition granularities and whose actual partition granularities do not reach the minimum partition granularities thereof.

11. The method of claim 10, wherein the processor is further configured to:
when each said partial reconfigurable region in the system has a first utilization level greater than a third threshold and has a first actual resource utilization level smaller than a fourth threshold, according to an ascending order of the minimum partition granularities, successively optimizing the actual partition granularities of the corresponding to-be-optimized FPGAs until the first actual resource utilization levels are greater than a fifth threshold or until the actual partition granularity optimization of the last to-be-optimized FPGA has been completed, wherein the fourth threshold is smaller than or equal to the fifth threshold.

12. The method of claim 1, wherein the accelerator card B contains plural to-be-optimized FPGAs that have different minimum partition granularities and whose actual partition granularities do not reach the minimum partition granularities thereof.

13. The method of claim 12, wherein the processor is further configured to:
when each said partial reconfigurable region in the system has a first utilization level greater than a third threshold and has a first actual resource utilization level smaller than a fourth threshold, according to an ascending order of the minimum partition granularities, successively optimizing the actual partition granularities of the corresponding to-be-optimized FPGAs until the first actual resource utilization levels are greater than a fifth threshold or until the actual partition granularity optimization of the last to-be-optimized FPGA has been completed, wherein the fourth threshold is smaller than or equal to the fifth threshold.

14. The method of claim 13, wherein the step of optimizing the actual partition granularity comprises:
determining whether it is possible to make a second utilization level of the present to-be-optimized FPGA greater than or equal to a sixth threshold and make a second actual resource utilization level of the present to-be-optimized FPGA greater than or equal to a seventh threshold by partitioning the actual partition granularity of the present to-be-optimized FPGA to its corresponding minimum partition granularity, and then transiting the accelerator modules in other FPGAs having greater actual partition granularities to the present to-be-optimized FPGA in a manner that meets the configuration requirements and in a descending order of third resource utilization levels of individual partial reconfiguration regions, and if yes, partitioning the present to-be-optimized FPGA into its corresponding minimum partition granularity, and if not, maintaining the original actual partition granularity of the present to-be-optimized FPGA and according to said order taking the next to-be-optimized FPGA as the present to-be-optimized FPGA and repeating the previous step.

15. The method of claim 1, wherein the accelerator card B contains plural to-be-optimized FPGAs that have different minimum partition granularities and whose actual partition granularities do not reach the minimum partition granularities thereof.

16. The method of claim 15, wherein the processor is further configured to:
when each said partial reconfigurable region in the system has a first utilization level greater than a third threshold and has a first actual resource utilization level smaller than a fourth threshold, according to an ascending order of the minimum partition granularities, successively optimizing the actual partition granularities of the corresponding to-be-optimized FPGAs until the first actual resource utilization levels are greater than a fifth threshold or until the actual partition granularity optimization of the last to-be-optimized FPGA has been completed, wherein the fourth threshold is smaller than or equal to the fifth threshold.

17. The method of claim 16, wherein the step of optimizing the actual partition granularity comprises:
determining whether it is possible to make a second utilization level of the present to-be-optimized FPGA greater than or equal to a sixth threshold and make a second actual resource utilization level of the present to-be-optimized FPGA greater than or equal to a seventh threshold by partitioning the actual partition granularity of the present to-be-optimized FPGA to its corresponding minimum partition granularity, and then transiting the accelerator modules in other FPGAs having greater actual partition granularities to the present to-be-optimized FPGA in a manner that meets the configuration requirements and in a descending order of third resource utilization levels of individual partial reconfiguration regions, and if yes, partitioning the present to-be-optimized FPGA into its corresponding minimum partition granularity, and if not, maintaining the original actual partition granularity of the present to-be-optimized FPGA and according to said order taking the next to-be-optimized FPGA as the present to-be-optimized FPGA and repeating the previous step.

18. An FPGA-based system for network functions accelerating, wherein the system comprises a physical machine A and an accelerator card B connected through a PCIe channel, wherein the physical machine A includes a processor and the accelerator card B includes an FPGA, which the accelerator card B serves to provide network function accelerating for the processor;
the processor, when it requires the accelerator care to provide the network function accelerating, check whether there is any required accelerator module present in the FPGA, and if yes, acquire an accelerating function ID corresponding to the required accelerator module, and if not, select at least one partial reconfigurable region B1 in the FPGA and configure it into the required accelerator module and generate a corresponding accelerating function ID, and/or sending an accelerating request to the FPGA, wherein the accelerating request includes a to-be-processed data packet and the accelerating function ID, and
the FPGA, according to the accelerating function ID, send the accelerating request to the required accelerator module for acceleration, wherein the step of selecting at least one partial reconfigurable region B1 in the FPGA and configuring it into the required accelerator module am generating the corresponding accelerating function ID comprises: determining whether there is any first-type partial reconfigurable region in the system meeting configuration requirements, and if yes, selecting and configuring at least one said first-type partial reconfigurable region, and if not, determining whether there is any second-type partial reconfigurable region in the system meeting the configuration requirements, and if yes, selecting and configuring at least one said second-type partial reconfigurable regions, and if not, transiting the accelerator module, so as to provide said to-be-processed data packet with the partial reconfigurable region that meets the configuration requirements, wherein the first-type partial reconfigurable region is an un-configured partial reconfigurable region, and the second-type partial reconfigurable region is a configured partial reconfigurable region whose use frequency is smaller than a first threshold and/or which has not been used for a duration longer than a second threshold.

* * * * *